United States Patent
Kelly

(10) Patent No.: US 10,062,185 B2
(45) Date of Patent: Aug. 28, 2018

(54) METHOD AND APPARATUS FOR REDUCING VARIABILITY OF REPRESENTATIONS OF REGIONS OF INTEREST ON RECONSTRUCTIONS OF MEDICAL IMAGING DATA

(71) Applicant: Siemens Medical Solutions USA, Inc., Malvern, PA (US)

(72) Inventor: Matthew David Kelly, Botley (GB)

(73) Assignee: Siemens Medical Solutions USA, Inc., Malvern, PA (US)

(*) Notice: Subject to any disclaimer, the term of this patent is extended or adjusted under 35 U.S.C. 154(b) by 44 days.

(21) Appl. No.: 15/165,289

(22) Filed: May 26, 2016

(65) Prior Publication Data

US 2016/0350947 A1  Dec. 1, 2016

(30) Foreign Application Priority Data

May 26, 2015  (GB) .................................. 1508915.4

(51) Int. Cl.
*G06T 11/00* (2006.01)
*G06T 5/20* (2006.01)
*G06T 19/00* (2011.01)

(52) U.S. Cl.
CPC .............. *G06T 11/008* (2013.01); *G06T 5/20* (2013.01); *G06T 19/00* (2013.01); *G06T 2207/10104* (2013.01); *G06T 2207/20104* (2013.01); *G06T 2207/30096* (2013.01); *G06T 2210/41* (2013.01)

(58) Field of Classification Search
CPC ......... G06T 7/0012; G06T 2207/10088; G06T 7/11; G06T 7/149; G06T 2207/20096; G06T 5/002; G06K 9/3233; G06K 9/0014
See application file for complete search history.

(56) References Cited

U.S. PATENT DOCUMENTS

| | | | |
|---|---|---|---|
| 2005/0113680 A1* | 5/2005 | Ikeda ..................... | A61B 6/481 600/425 |
| 2005/0187851 A1* | 8/2005 | Sant ....................... | G06Q 40/06 705/36 R |
| 2011/0026797 A1* | 2/2011 | Declerck ............... | G06T 7/0012 382/131 |
| 2014/0079644 A1* | 3/2014 | Li .......................... | A61K 49/0032 424/9.323 |
| 2016/0335770 A1* | 11/2016 | Lin ........................ | A61B 6/481 |

* cited by examiner

*Primary Examiner* — Haixia Du
(74) *Attorney, Agent, or Firm* — Schiff Hardin LLP

(57) ABSTRACT

In a method and apparatus for reducing variability of representations of regions of interest in reconstructions of original imaging data, a processor performs a reconstruction on the original imaging data to provide original image data, applies a filter to the original image data to provide filtered image data, displays the original image data to a user as an original image, at said display monitor, receives input parameters from the user to define a volume of interest, applies the input parameters to the filtered image data to generate a contour defining the volume of interest in the filtered image data, and displays the contour defining the volume of interest in the filtered image data to the user on the original image at said display monitor.

12 Claims, 2 Drawing Sheets

METHOD AND APPARATUS FOR REDUCING VARIABILITY OF REPRESENTATIONS OF REGIONS OF INTEREST ON RECONSTRUCTIONS OF MEDICAL IMAGING DATA

BACKGROUND OF THE INVENTION

Field of the Invention

The present invention concerns a method and apparatus for displaying representations of regions of interest in reconstructions of medical imaging data.

In particular, the present invention relates to a method and an apparatus for improving consistency in representation of regions of interest in different data sets obtained by different systems at different times.

Description of the Prior Art

In the medical imaging field, several imaging schemes are known. For example PET (Positron Emission Tomography) is a method for imaging a subject in 3D using an injected radio-active substance which is processed in the body, typically resulting in an image indicating one or more biological functions.

The Standardized Uptake Value (SUV) is a widely-used measure for quantifying radiotracer uptake in clinical PET scans. This value is computed from the number of counts of emission events recorded per voxel in the image reconstructed from event data captured in the PET scan. Its use is intended to provide normalization for differences in patient size and body composition, along with the dose of radiotracer injected, thereby enabling inter-study comparison, both between and within individual patients.

While raw scan data may be expressed in units of Bq/ml, SUV is calculated as:

$$\frac{\text{scan data (in } Bq/\text{ml)} \times \text{patient mass (in grams)}}{\text{total injected dose (in } Bq)}$$

This is typically simplified by assuming that the patient has a density of 1 g/ml, in which case the SUV becomes dimensionless.

SUVmax is the maximum observed value of SUV within a region of interest: typically a three-dimensional volume of interest, for example a representation of a lesion.

While differences in body composition and injected dose represent one source of variation, differences in scanner hardware and reconstruction software represent others, and these are not addressed by the use of SUV.

It has been observed that a single set of raw scan data may result in differing values for SUV, and so also for SUVmax, depending on the reconstruction applied to the raw scan data. A "reconstruction", in this context, is the treatment applied to a digital photon count to convert it into image data. Practically, it is carried out by a digital computer. For example, a low resolution reconstruction will result in significant "blurring" of the image produced, so that a small lesion may appear to have a lower SUVmax than in reality, while a larger lesion of a same SUV will appear to have a larger, and possibly correct, SUVmax. Using a higher-resolution reconstruction on the same raw data will show images with more clearly-defined edges, in turn meaning that small lesions will appear to have greater SUVmax than under the lower-resolution reconstruction. SUVmax is typically the clinically-reported result of a scan.

SUVmax is the SUV of the voxel with the highest value in the region of interest. SUVpeak is the mean SUV of a 1 $cm^3$ sphere positioned within the region of interest so as to maximize SUVpeak. So, whereas SUVmax considers only a single voxel, SUVpeak considers a small cluster of voxels.

It is clearly undesirable for the results of the PET scan to vary according to the reconstruction applied. For example, it may be required to evaluate a patient's progress by comparing two PET scan results taken at different times on different scanners. Each may have a different reconstruction, for example because a newer scanner has a higher resolution capacity. However, the two results must be aligned, that is, made comparable.

While SUVmax and SUVpeak provide an indication of the most metabolically-active region within a lesion, other measures such as metabolic tumor volume (MTV) or total lesion glycolysis (TLG) provide an indication of the total metabolic burden of a lesion. MTV is the volume enclosed by PET-derived lesion volume and TLG is the product of the MTV and SUVmean of the delineated volume.

While MTVs have shown promise as prognostic indicators and for assessing treatment response, a barrier to their widespread adoption is their dependence on scanner hardware and reconstruction protocol used to generate the image, which inhibits reproducibility and comparability between sites.

The dependence of SUV values on scanner hardware and reconstruction protocol is well established. Its reliance on a single maximal voxel value makes SUVmax particularly sensitive to differences in noise, resolution and contrast recovery, properties that vary between scanner models and reconstruction protocols. Since MTVs are typically defined using absolute or relative SUV thresholds, these volumes are also sensitive to differences in scanner model and reconstruction protocol.

In an attempt to address this variability, the EANM procedure guidelines provide specifications for activity concentration recovery coefficients (RC), as measured for example with an NEMA NU-2 IQ phantom. RCs measure the ability of an imaging system to recover the true activity concentration ratio between regions with different activity concentrations. They are a useful indicator of clinical scanner performance, incorporating the effects of scanner resolution, sensitivity, accuracy of the various corrections performed along with the reconstruction parameters such as number of iterations and subsets, and post filter smoothing.

Using a reconstruction protocol that meets these specifications ensures the generated SUV values are harmonized and therefore comparable across scanners and sites. One limitation of this approach, however, is the requirement to use a reconstruction protocol that aligns with an RC specification achievable by the majority of scanners in clinical use. This has the potential to negate the benefits of advances in technology which improve image quality and lesion detectability.

The following prior art documents may aid an understanding of the present invention:

Boellaard R, Krak N C, Hoekstra O S, Lammertsma A a: *Effects of noise, image resolution, and ROI definition on the accuracy of standard uptake values: a simulation study.* J Nucl Med 2004, 45:1519-27.

Boellaard R, O'Doherty M J, Weber W a, Mottaghy F M, Lonsdale M N, Stroobants S G, Oyen W J G, Kotzerke J, Hoekstra O S, Pruim J, Marsden P K, Tatsch K, Hoekstra C J, Visser E P, Arends B, Verzijlbergen F J, Zijlstra J M, Comans E F I, Lammertsma A a, Paans A M, Willemsen A T, Beyer T, Bockisch A, Schaefer- Prokop C, Delbeke D, Baum R P, Chiti A, Krause B J: *FDG PET and PET/CT: EANM procedure guidelines for tumor PET imaging: version* 1.0. Eur J Nucl Med Mol Imaging 2010, 37:181-200.

Jaskowiak C J, Bianco J A, Perlman S B, Fine J P, Ct FPET, Uptake S: *Influence of Reconstruction Iterations on 18 F-FDG PET/CT Standardized Uptake Values.* 2005:424-428.

Kelly M D, Declerck J M: SUVref: reducing reconstruction-dependent variation in PET SUV. EJNMMI Res 2011, 1:16.

NEMA NU 2-2012 *Performance Measurements of Positron Emission Tomographs*. Natl Electr Manuf Assoc 2013.

Van de Wiele C, Kruse V, Smeets P, Sathekge M, Maes A: *Predictive and prognostic value of metabolic tumor volume and total lesion glycolysis in solid tumours*. Eur J Nucl Med Mol Imaging 2013, 40:290-301.

Wahl R L, Jacene H, Kasamon Y, Lodge M a: *From RECIST to PERCIST: Evolving Considerations for PET response criteria in solid tumors*. J Nucl Med 2009, 50 Suppl 1:122S-50S.

SUMMARY OF THE INVENTION

The present invention aims to provide a method and an apparatus for visualizing MTV representations in a more repeatable manner, with reduced dependence on scanner hardware and reconstruction protocol.

The invention accordingly attempts to provide a method and an apparatus for obtaining consistent representation of MTV across different scanners and sites, while retaining the benefit of maximum available image quality from the available image data.

The above object is achieved in accordance with the invention by a method and apparatus for reducing variability of representations of regions of interest on reconstructions of original imaging data, wherein a processor performs a reconstruction on the original imaging data to provide original image data, applies a filter to the original image data to provide filtered image data, displays the original image data to a user as an original image, at said display monitor, receives input parameters from the user to define a volume of interest, applies the input parameters to the filtered image data to generate a contour defining the volume of interest in the filtered image data, and displays the contour defining the volume of interest in the filtered image data to the user on the original image at said display monitor

DESCRIPTION OF THE PREFERRED EMBODIMENTS

A known method and arrangement as described in U.S. Pat. No. 8,755,574 and GB2469569 employs phantom-derived data to generate a filter which, when applied to image data will bring its resolution to a known, standard level to ensure that medical imaging data sets from different scanners and different sites are comparable.

The present invention will be described below in the context of such an arrangement and method, although the invention could be employed using filters derived from any suitable phantom, or by non-phantom-based methods.

A single set of medical image data can thereby be used to general both an ORIGINAL image and a FILTERED image, resulting from application of the derived filter.

The original image may have a greater resolution than the filtered image, and a reading clinician may prefer to look at the original image to derive information on the state of the patient. However, the filtered image enables a coherent comparison to be made with image data from different systems, or derived from different reconstruction methods.

The present invention improves upon this arrangement by providing re-calculation of the VOI on the filtered image data. A re-computation step is provided, applying the instructions given by the reading clinician to create the VOI on the original image to create a new VOI in the filtered data. For example, input parameter values used by the reading clinician to define the VOI may include one or more click-point locations, a bounding box, absolute or relative SUV threshold. The input parameter values are applied to the filtered image data and a corresponding, new VOI calculated in the filtered image data. The resulting new VOI is displayed on the original image. In addition, the new VOI may be displayed on the filtered image along with display on the original image. Measures derived from the new VOI such as MTV, TLG, SUVmax or SUVmean may be displayed along with, or instead of, the display of VOI.

Figure 1:
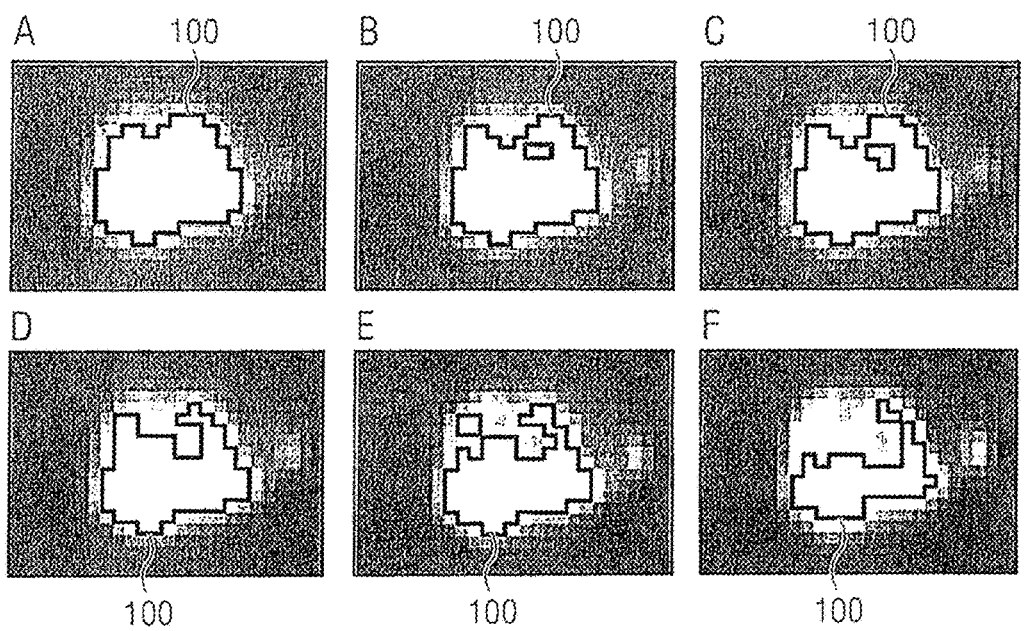
FIG. 1 shows six images of a single lesion, derived from a same PET dataset of a lesion, using respective different reconstruction protocols overlain with VOI contours calculated according to the prior art.

According to an aspect of the present invention, because the new VOI is calculated on the filtered image data, its definition is more consistent across different scanners and reconstruction protocols. For example, FIG. 1 shows six images A-F of a single lesion. The images A-F were all derived from a same PET dataset of a lesion, using respective different reconstruction protocols. In each case, the original PET image is shown, although a corresponding filtered image will have been produced for each case.

In each of the images A-F, in this example, the VOI was defined by a relative threshold of 50% SUVmax. That is, the maximum value of SUV in the lesion is found, and a contour representing voxels having an SUV corresponding to 50% of that value is defined. Those contours are shown on the respective images A-F. The volume lying within that contour is the VOI. As can be clearly seen in respective images A-F of FIG. 1, each of the reconstruction protocols causes a different VOI to be determined, despite being based on a common set of PET imaging data.

In each case, the VOI contour 100 is shown on the original image. In a typical conventional operation, the VOI would be defined as depicted, the contour 100 sent as a binary mask to the filtered image for calculation of parameters such as MTV or TLG. Clearly, a different result will be returned in each case, even if the filtered image data is consistent in each case.

According to a feature of the present invention, rather than sending the contour to the filtered image data, for example in the form of a binary mask, the input parameters used by the reading clinician are sent to the filtered image data and the volume of interest VOI is re-computed. In this example, the reading clinician decided that the VOI should be defined by a contour of SUV having a value of 50% SUVmax. Accordingly, in the method of the present invention, the input parameters "50% SUVmax" are sent to the filtered image data. Those parameters are applied to the filtered image data and a new VOI calculated.

Figure 2:
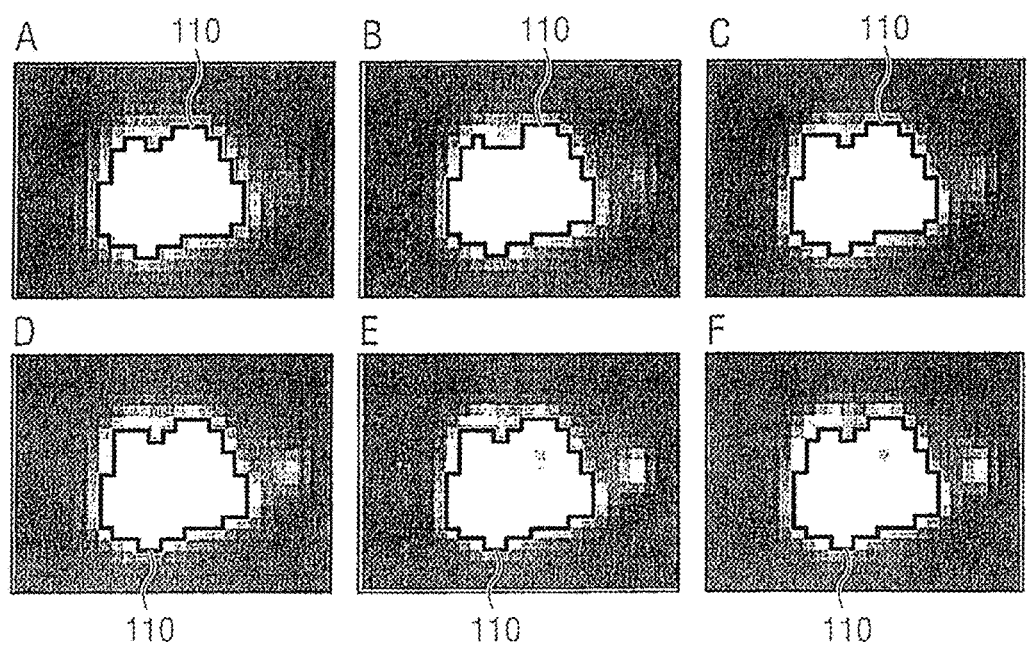
FIG. 2 shows six images of a single lesion, derived from a same PET dataset of a lesion, using respective different reconstruction protocols overlain with VOI contours calculated according to an embodiment of the present invention.

FIG. 2 shows six images A-F. Each corresponds to the respective original image A-F shown in FIG. 1, but overlain with the new VOI contour 110 calculated from the filtered data. As can clearly be seen, the new VOI contours are much more consistent between the images, reflecting the improved consistency of the filtered data.

A reading clinician can view the high resolution original image, while also viewing VOI regions defined at will but calculated on the filtered image data. By providing more consistent VOI measurement across multiple reconstruction protocols, the invention will ensure that more consistent measurement of MTV and TLG will be produced. This allows coherent comparison of image data acquired on different systems—for example, images of a same patient captured at different times on different systems. The present invention allows such data sets to be compared coherently, to give a reliable indication of change in a detected lesion.

Optionally, provision may be made to allow a reading clinician to modify the input parameters for defining a VOI. Commonly, this may be by adjusting the SUV threshold used to define the boundary of the VOI. The SUV threshold is typically defined in terms of percentage of SUV max. A convenient way of arranging for such variation would be to provide an on-screen slider allowing the reading clinician to adjust the input parameters, such as SUV threshold, in real time. The adjusted threshold is sent to the filtered image data and applied to the filtered image data to calculate a VOI contour which is then applied to the original image displayed to the reading clinician. The reading clinician may apply other modifications in a similar way. The VOI contour may defined by parameters other than a relative SUV threshold as described above, such as click point location, bounding box, absolute SUV threshold.

The reading clinician may choose to view the filtered image data in addition to, or instead of, the original image data. This may be limited to the region of the VOI contour, or through the whole image view.

The VOI may be defined according to any segmentation method, for example absolute SUV threshold, relative SUV threshold as a fraction of SUVmax, adaptive threshold, or a gradient based criterion specifying a threshold of SUV gradient. An "adaptive threshold" is a segmentation method which may be used on PET image data that considers local background uptake. Specifically, the adaptive threshold is calculated as a percentage of the difference between the maximum SUV and the mean SUV in the local background as defined by an additional region of interest, for example. Input parameters for defining and adaptive threshold typically include a bounding box for the lesion, a bounding box for the local background and a threshold.

The method of the invention has been described with specific reference to PET images, but may be applied to other modalities, especially other functional modalities such as SPECT.

The filter used to provide the filtered image data could be selected to align any set of reference recovery coefficients, e.g. those measured for a specific scanner model could be used instead of a common standard such as those defined by EANM. Both phantom-based and non-phantom-based methods may be used to derive appropriate filters to quantitatively align the scanner model and reconstruction combinations.

The representation of the VOI may be displayed in any conventional manner, such as a contour, mask, colour cast.

The VOI generated by the filtered image data may be displayed alongside the VOI generated by the original data to provide a visual indication of the impact of the scanner model and reconstruction protocol.

Figure 3:
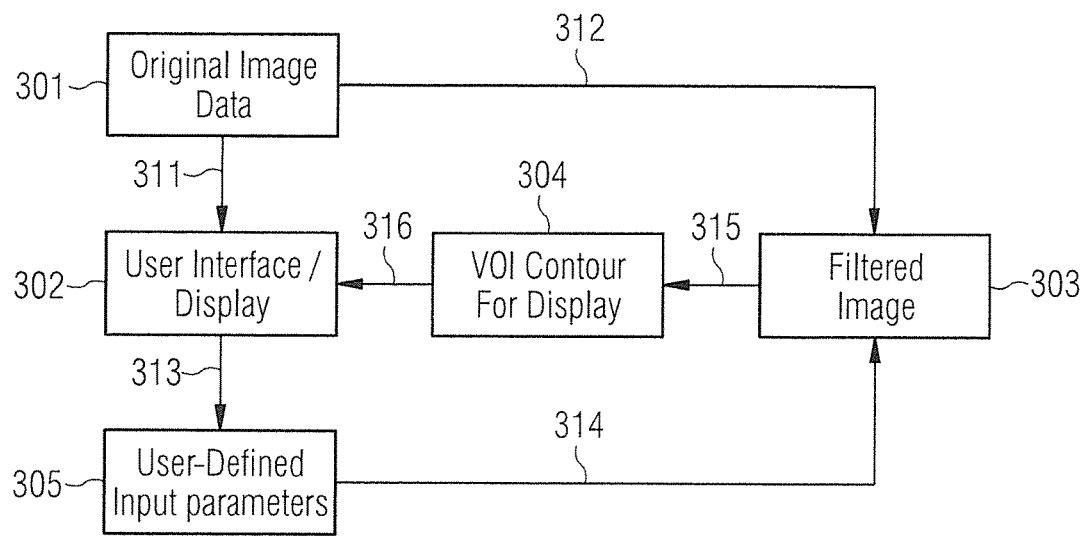
FIG. 3 shows a flow diagram of a method according to an embodiment of the present invention.

FIG. 3 shows a flowchart of a method according to an embodiment of the present invention.

According to this embodiment, a set of medical imaging data 301 is acquired. A reconstruction step 311 generates original image data 301 for display to the user. A filtering step 312 with reconstruction generates filtered image data 303. A user then provides input parameters 305 in a parameter input step 313, to define a volume of interest VOI in the original image data. The input parameters 305 are then applied in step 314 to the filtered image data 303 to define the volume of interest VOI in the filtered image data. The VOI contour is calculated in step 315 by applying the user-defined input parameters 305 to the filtered image data 303 to generate the VOI contour for display 304. The VOI contour calculated on the filtered image data is displayed on the user interface/display 302.

Figure 4:
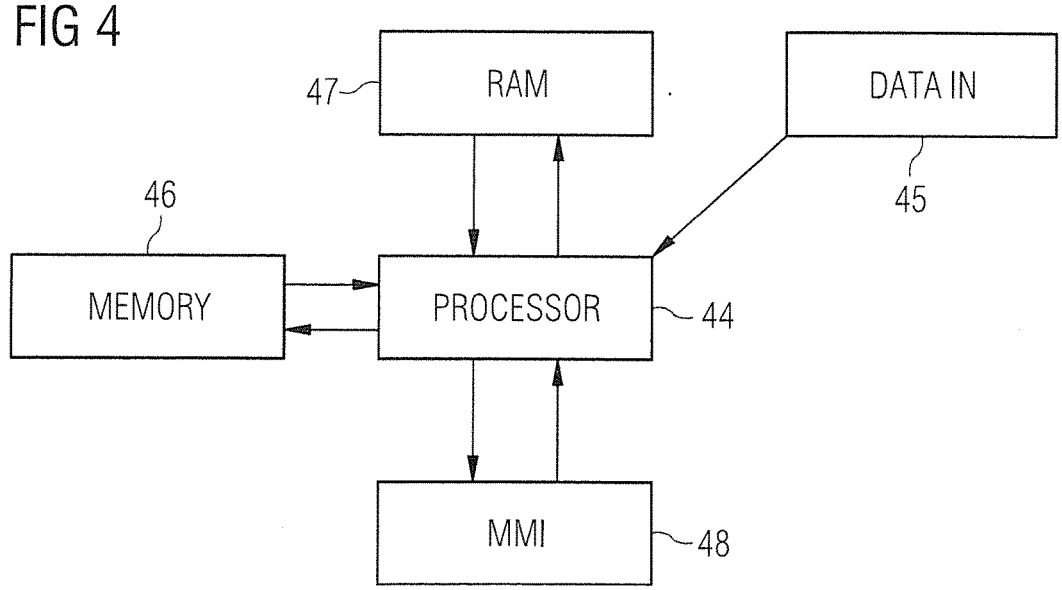
FIG. 4 shows a block diagram of a computer system which may be employed in an embodiment of the present invention.

Referring to FIG. 4, the above embodiments of the invention may be conveniently realized as a computer system suitably programmed with instructions for carrying out the steps of the methods according to the invention.

For example, a central processor 404 is able to receive data representative of medical scans via a port 405 which can be a reader for portable data storage media (e.g. CD-ROM); a direct link with apparatus such as a medical scanner (not shown) or a connection to a network.

For example, in an embodiment, the central processor 404 performs such steps (algorithms) as a reconstruction applied to the medical imaging data to provide original image data; applying a filter to the original image data to provide filtered image data; displaying the original image data to a user as an original image; receiving input parameters from the user to define a volume of interest (VOI); applying the input parameters to the filtered image data to generate a contour (110) defining the volume of interest in the filtered image data; and displaying the contour defining the volume of interest in the filtered image data to the user on the original image.

Software applications loaded on memory 406 are executed to process the image data in random access memory 407.

A Man-Machine interface 408 typically includes a keyboard/mouse/screen combination which allows user input such as initiation of applications and a screen on which the results of executing the applications are displayed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for reducing variability of representations of regions of interest on reconstructions of original imaging data, comprising:
   in a computer, performing a reconstruction on the original imaging data to provide original image data;
   in said computer, applying a filter to the original image data to provide filtered image data;
   displaying the original image data to a user as an original image, at a display monitor in communication with said computer;
   receiving input parameters into the computer from the user to define a volume of interest (VOI);

in said computer, applying the input parameters to the filtered image data to generate a contour in the filtered image data defining the VOI in the filtered image data; and at said display monitor, displaying the contour defined in the filtered image data to the user superimposed on the original image.

2. A method according to claim 1 comprising, in said computer, applying the input parameters to the original image data to define a contour that defines the VOI in the original image data, and displaying the contour to the user on the original image at said display monitor.

3. A method according to claim 1 wherein the input parameters comprise at least one of: click-point locations; a bounding box for a lesion; a bounding box for a local background; an absolute Standard Uptake Value (SUV) threshold; a relative SUV threshold; or a gradient based criterion specifying a threshold of an SUV gradient.

4. A method according to claim 1 comprising displaying the contour to the user on the filtered image at said display monitor.

5. A method according to claim 1 comprising, in said computer, calculating a volume of the VOI in the filtered image data.

6. A method according to claim 5, comprising, in said computer, using the calculated volume of the VOI in the filtered data to calculate a value of metabolic tumor volume or total lesion glycolysis of the VOI.

7. A method according to claim 1, comprising, via said computer, allowing the user to modify the input parameters and in response to the user modifying the input parameters, repeating the following steps:

applying the modified input parameters in said computer to the filtered image data to generate a contour in the filtered image data defining a modified VOI in the filtered image data; and displaying the contour in the filtered image data defining the modified VOI to the user superimposed on the original image at said display monitor.

8. A method according to claim 7 comprising at, said display monitor, providing the user with an on-screen slider allowing the user to adjust the input parameters in real time.

9. A method according to claim 1 comprising, at said display monitor, displaying filtered image data to the user in the region of the volume of interest contour.

10. A method according to claim 1, comprising:

in said computer, applying the input parameters to the original image data to define a contour that defines the VOI in the original image data; and displaying the contour defining the VOI in the original image data to the user on the original image at said display monitor.

11. An apparatus for identifying a region of interest in original imaging data of a subject, comprising:

a processor;

a display monitor in communication with said processor;

said processor being configured to perform a reconstruction on original imaging data to provide original image data, apply a filter to the original image data to provide filtered image data, display the original image data to a user as an original image at said display monitor, receive input parameters from the user to define a volume of interest, apply the input parameters to the filtered image data to generate a contour in the filtered image data defining the volume of interest in the filtered image data; and said processor being configured to display the contour defined in the filtered image data to the user superimposed on the original image at said display monitor.

12. A non-transitory, computer-readable data storage medium encoded with programming instructions, said storage medium being loaded into a processor that is in communication with a display monitor, and said programming instructions causing said processor to:

performing a reconstruction on the original imaging data to provide original image data;

apply a filter to the original image data to provide filtered image data;

display the original image data to a user as an original image at said display monitor;

receive input parameters from the user to define a volume of interest (VOI);

apply the input parameters to the filtered image data to generate a contour in the filtered image data defining the VOI in the filtered image data; and display the contour defined in the filtered image data to the user superimposed on the original image at said display monitor.

* * * * *